US007631933B2

(12) United States Patent  (10) Patent No.: US 7,631,933 B2
Fujita et al.  (45) Date of Patent: Dec. 15, 2009

(54) SEAT

(75) Inventors: Etsunori Fujita, Hiroshima (JP); Seiji Kawasaki, Hiroshima (JP); Yasuhide Takata, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 386 days.

(21) Appl. No.: 11/660,670

(22) PCT Filed: Aug. 25, 2005

(86) PCT No.: PCT/JP2005/015397

§ 371 (c)(1),
(2), (4) Date: Feb. 21, 2007

(87) PCT Pub. No.: WO2006/022315

PCT Pub. Date: Mar. 2, 2006

(65) Prior Publication Data

US 2007/0205643 A1 Sep. 6, 2007

(30) Foreign Application Priority Data

Aug. 26, 2004 (JP) .............................. 2004-247308

(51) Int. Cl.
B60R 21/00 (2006.01)
B60N 2/427 (2006.01)
(52) U.S. Cl. .............................. 297/216.12; 297/216.13
(58) Field of Classification Search ............ 297/216.12, 297/216.13, 216.14, 284.4
See application file for complete search history.

(56) References Cited

U.S. PATENT DOCUMENTS

| 3,544,164 | A  | * | 12/1970 | Ohta ........................ 297/452.2 |
| 5,129,707 | A  | * | 7/1992  | Yamauchi .............. 297/216.14 |
| 5,645,316 | A  | * | 7/1997  | Aufrere et al. ......... 297/216.13 |
| 5,884,968 | A  | * | 3/1999  | Massara ................. 297/216.12 |
| 6,250,714 | B1 | * | 6/2001  | Nakano et al. ......... 297/216.12 |
| 6,375,262 | B1 | * | 4/2002  | Watanabe ................ 297/284.4 |
| 6,398,299 | B1 | * | 6/2002  | Angerer et al. ......... 297/216.12 |
| 6,520,577 | B2 | * | 2/2003  | Kitagawa ................ 297/216.13 |
| 6,783,177 | B1 | * | 8/2004  | Nakano .................. 297/216.12 |
| 6,921,132 | B2 | * | 7/2005  | Fujita et al. ............ 297/216.13 |
| 2004/0124686 | A1 | * | 7/2004 | Malsch et al. ............... 297/410 |
| 2004/0145223 | A1 |   | 7/2004 | Lee |

FOREIGN PATENT DOCUMENTS

| JP | U 6-65076   | 9/1994  |
| JP | U 6-75250   | 10/1994 |
| JP | A 10-291434 | 11/1998 |

(Continued)

Primary Examiner—Peter R. Brown
(74) Attorney, Agent, or Firm—Oliff & Berridge, PLC

(57) ABSTRACT

A seat includes a back part frame which is elastically deformable in a direction such that right and left side part frames are brought closer to, or moved away from, each other, and a tensile structural element which is stretched between the right and left side part frames so as to configure a backrest. Further, a headrest is provided at an upper part of the back part frame. In addition, the tensile structural element is stretched over the back part frame so as to configure a backrest, and is configured such that the back part frame is deformed so that the headrest is moved forward due to a tensile force resulting from a load imparted on the backrest.

2 Claims, 7 Drawing Sheets

FOREIGN PATENT DOCUMENTS

| | | |
|---|---|---|
| JP | A 11-048841 | 2/1999 |
| JP | A 2000-185582 | 7/2000 |
| JP | A 2000-325179 | 11/2000 |
| JP | A 2003-025891 | 1/2003 |
| JP | A 2004-131059 | 4/2004 |

* cited by examiner

SEAT

BACKGROUND

1. Technical Field

The present invention pertains to a seat, and particularly to a vehicle seat to be mounted on a vehicle, such as an automobile.

2. Related Art

A vehicle seat to be mounted on a vehicle, such as an automobile, has a structure in which a back part (a seat back) is connected to the rear end part of a seat part (a seat cushion) such that the inclined position thereof is adjustable through a reclining mechanism.

Further, for a vehicle seat, a structure is known which, in order to secure the rigidity of the back part, includes a thick type back part frame. With such a vehicle seat, the back part frame has a high rigidity so that at the time of a collision, impact absorption due to a deformation of the frame is not achieved, i.e., an impact force (acceleration) is transmitted directly to a seated person, without being damped, which may cause damage to the seated person. In addition, with such a vehicle seat, since the back part frame has a high rigidity, vibration absorbing characteristics depend on a cushioning material constituting a backrest provided for the back part frame, and thus it is difficult to obtain good vibration absorbing characteristics.

Further, a vehicle seat, which is provided with a thin type back part frame having a high elasticity, has been developed. In such a vehicle seat, the vibration absorbing characteristics are relatively good, however, if, for example, at the time of a vehicle collision, or the like, a great impact force is applied, the rigidity becomes insufficient, resulting in the possibility that the movement of a seated person due to the inertia cannot be prevented with certainty for protection of the seated person.

In addition, for a vehicle seat, it has been conceived that, in order to alleviate neck damage to a seated person (an occupant), a headrest for restricting the movement of the head of the seated person at the time of a collision (especially a rear collision), or the like, is positively moved to the head side to suppress the amount of movement of the head (for example, referring to patent document 1 to patent document 3).

In the patent document 1, an automobile seat is disclosed which has a structure in which a headrest mounting part is provided at the upper end part of an impact-receiving frame which, in a portion in the vicinity of the upper end, is anchored to the upper side pipe part of a seat back frame; and, at the time of a rear collision, the portion which is below the upper side pipe part of the impact-receiving frame is pressed rearward by the seated person, resulting in the upper side pipe part being twisted, and the headrest being automatically moved toward the head side of the seated person (forward). In patent document 2, a vehicle seat structure is disclosed in which a headrest movable frame disposed in a seat back is supported by the seat back frame through a link mechanism; at the time of a rear collision, a wire stretched over the lower part of the headrest movable frame is pressed rearward by the lumber region of an occupant; and this pressing force is changed in direction by the link mechanism, resulting in the headrest being linearly moved upward and forward.

However, in the above-mentioned respective structures, since they are configured such that the impact-receiving frame or the wire is pressed by an occupant, even at a time of normal seating, the occupant will contact it so that an odd sensation will be given to the occupant. Especially, with a seat back structured by stretching a tensile structural element over the frame, this problem becomes more prominent.

On the other hand, in patent document 3, a vehicle seat is disclosed which is structured by stretching a cloth-like member having cushioning ability over a seat back frame including a pair of right and left side frames which is constituted by a side frame upper whose upper end is supported vertically movably with respect to the vehicle body and to which a headrest is fixed, and a side frame lower whose lower end is turnably supported with respect to the vehicle body and whose upper end is turnably connected to the lower end of the side frame upper. With this seat, at the time of a rear collision, the seated person presses the cloth-like member rearward, which causes the side frame upper and the side frame lower to be relatively turned in the direction in which they are brought closer to a straight line when viewed from the side face, thus moving the headrest upward and forward.

However, with this seat, the seat back frame is constituted by the side frame upper and the side frame lower which are turnably connected, but the rearward movement of the upper end of the side frame upper with respect to the vehicle body is restricted, and thus impact energy which causes the occupant to be moved rearward cannot be sufficiently absorbed. Further, with this configuration, since the upper end of the side frame upper is supported with respect to the vehicle body, thus for example, application of the configuration to the front seat, and the like, of a vehicle has been difficult.

Patent Document 1: Japanese Patent Laid-Open Publication No. 2000-185582

Patent Document 2: Japanese Patent Laid-Open Publication No. 2000-325179

Patent Document 3: Japanese Patent Laid-Open Publication No. 2003-25891

DISCLOSURE OF THE INVENTION

Problems to Be Solved by the Invention

One problem to be solved by the present invention is to obtain, in view of the above-mentioned facts, a seat which is good in both vibration absorbing characteristics and impact absorbing characteristics.

Another problem to be solved by the present invention is to obtain a seat which is capable of protecting the neck of a seated person at the time of impact input from the rear without impairing normal sitting comfort.

Means to Solve the Problems

A first aspect of the present invention provides a seat including: a back part frame which is capable of being elastically deformed in the direction in which right and left side part frames are brought closer to, or moved away from, each other; and a tensile structural element which is stretched between the right and left side part frames to configure a backrest.

A second aspect of the present invention provides a seat including: a back part frame; a headrest which is provided at an upper part of the back part frame; and a tensile structural element which is stretched across the back part frame to configure a backrest, and which causes the back part frame to be deformed such that the headrest is moved forward due to a tensile force which is produced by a load imparted to the backrest.

Effects of the Invention

As described above, the seat pertaining to the invention as stated in claim 1 provides an excellent effect that vibration absorbing characteristics and impact absorbing characteristics are both good. In addition, the seat pertaining to the invention as stated in claim 4 provides an excellent effect that the neck of the seated person can be protected at the time of impact input from the rear without impairing normal sitting comfort.

The other aspects, features, and advantages of the present invention will be clarified from the following description which is made with reference to the attached drawings.

BEST MODE FOR CARRYING OUT THE INVENTION

A vehicle seat 10 as a seat pertaining to a first embodiment of the present invention will be described with reference to FIG. 1 to FIG. 7. First, an outline of the overall configuration of the vehicle seat 10 will be described, and then a seat back 22 and a headrest 26, which are substantial portions of the present invention, will be described in detail. An arrow UP, an arrow LO, an arrow FR, an arrow RE, an arrow RI, and an arrow LE which are appropriately given in the respective drawings show the upward direction, the downward direction, the forward direction (the direction of vehicle progression), the rearward direction, the rightward direction, and the leftward direction, respectively, with the direction of progress of a vehicle, in which the vehicle seat 10 is mounted, as a reference. Hereinafter, when simply the upward, downward, forward, rearward, rightward or leftward direction is indicated, the direction corresponds to the respective one of the above-mentioned respective arrow directions.

Figure 1:
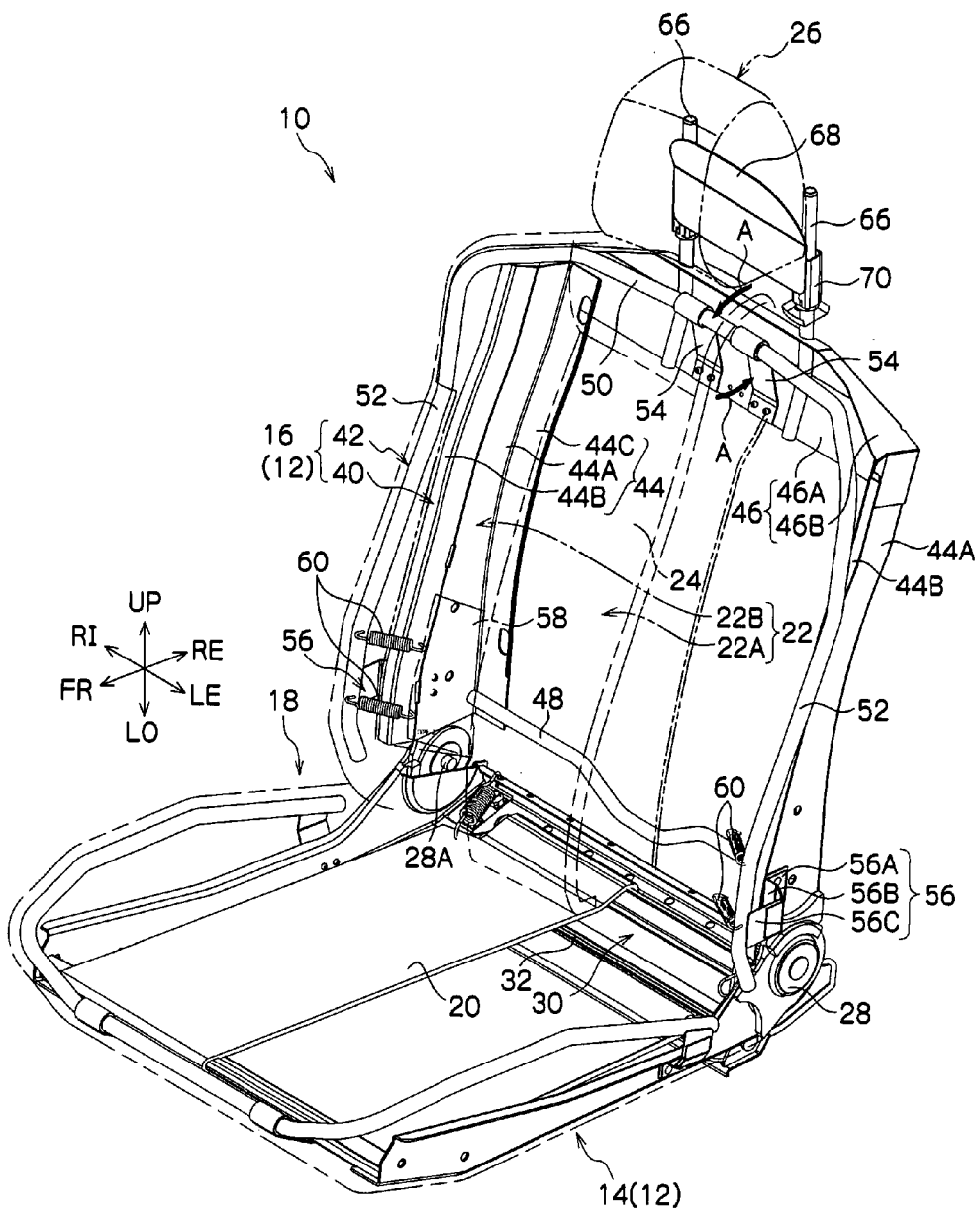
FIG. 1 is a perspective side view illustrating an overall outline of the configuration of a vehicle seat pertaining to an embodiment of the present invention.
Figure 2:
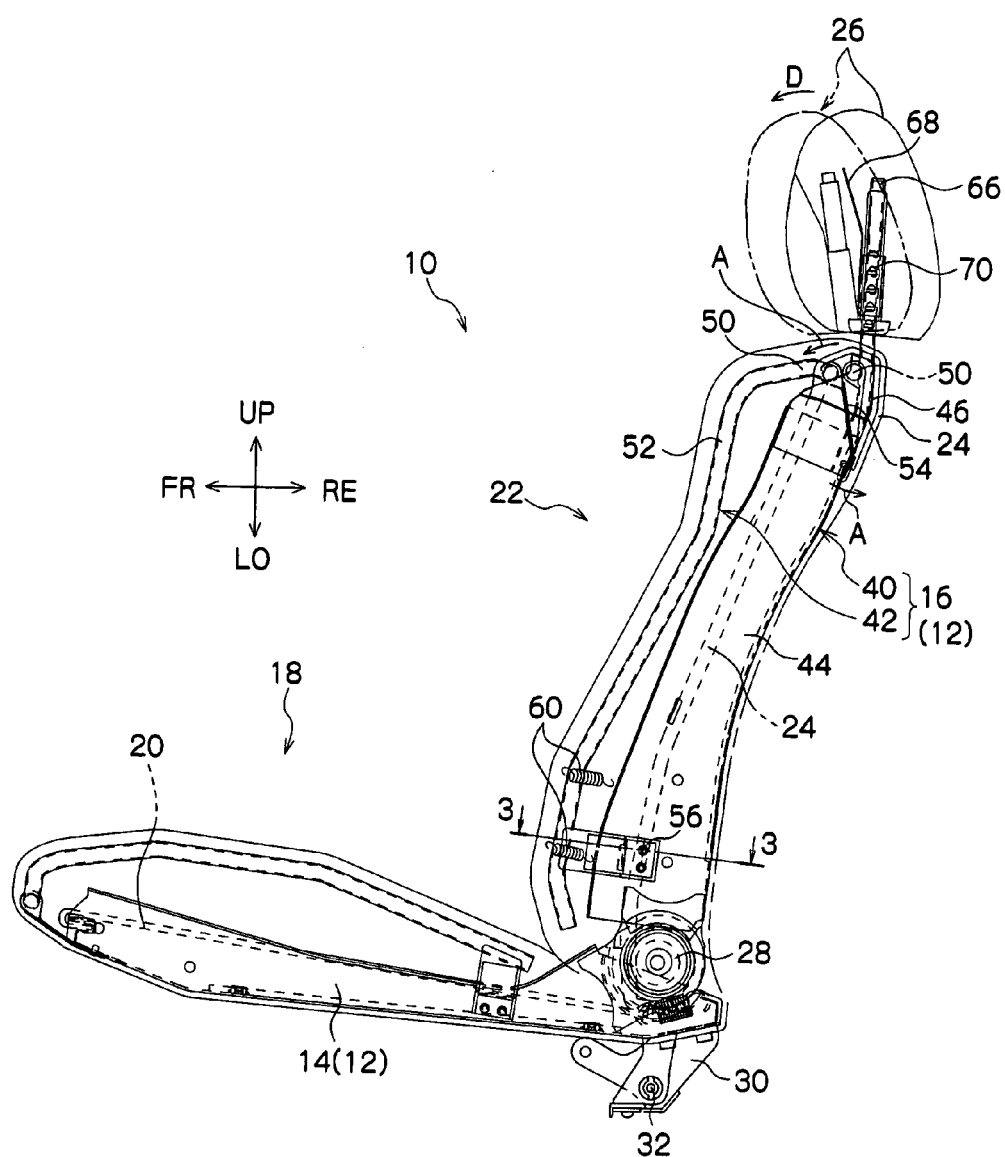
FIG. 2 is a side view of the vehicle seat pertaining to an embodiment of the present invention.

FIG. 1 is a perspective side view, partly cut out, illustrating an outline of the overall configuration of the vehicle seat 10, and FIG. 2 is a side view of the vehicle seat 10. As shown in these figures, the vehicle seat 10 includes a seat frame 12, and the seat frame 12 is configured to include a seat part frame 14, which is a seat cushion frame, and a back part frame 16, which is a seat back frame.

Further, a cushioning material 20 for the seat part frame 14 is provided so as to form a seat cushion 18 as a seat part, and a back part cushioning material 24 for the back part frame 16 is provided so as to form a seat back 22 as a back part. In addition, above the seat back 22, a headrest 26 is provided. With the seat back 22, the lower end of the back part frame 16 is connected to the rear end part of the seat part frame 14 through a reclining mechanism 28 to be turnable around a support shaft 28A, so that the seat back 22 can be turned around the support shaft with respect to the seat cushion 18 and held at a desired turned position.

The cushioning material 20 is in the form of a single layer or multiple layers including a layer made up of a three-dimensional knitted material, and the lowest layer is stretched over the seat part frame 14 formed substantially in the shape of a rectangular frame. For example, in case of a two-layer structure, the front end of the lower-layer seat material of the cushioning material 20 is attached to the front end of the seat part frame, and the rear end of the lower-layer seat material is elastically connected to the rear end of the seat part frame. Although a detailed description is omitted, in the present embodiment, at the rear end part of the seat part frame 14, the lower end of a movable frame 30 is turnably supported coaxially with a torsion bar 32 and one end of the torsion bar 32 is fixed to the seat part frame 14, the other end being made to be turned integrally with the movable frame 30.

Figure 7:
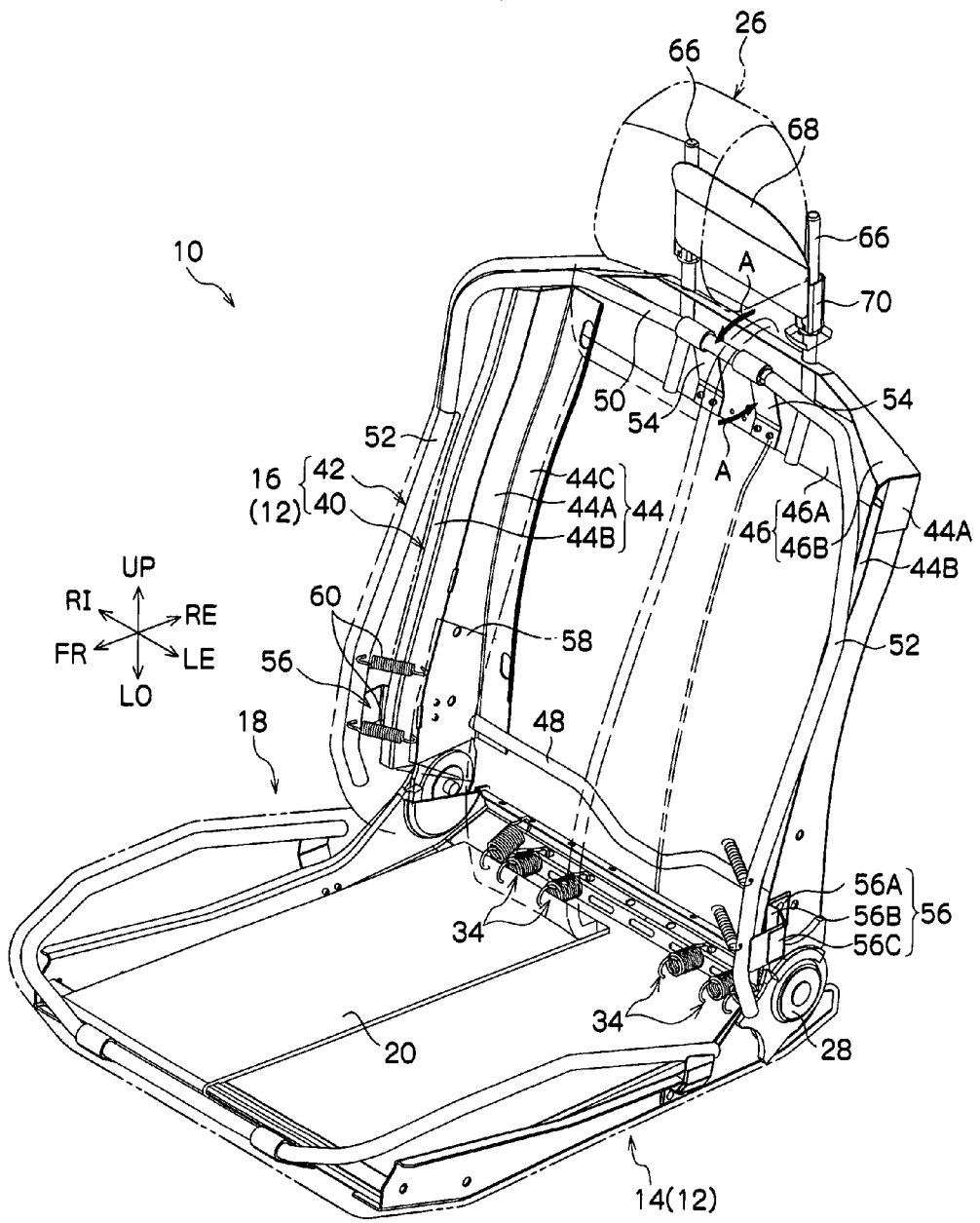
FIG. 7 is a perspective side view illustrating a modification of the vehicle seat pertaining to an embodiment of the present invention.

Further, the rear end of the lower-layer seat material of the cushioning material 20 is engaged with the upper end of the movable frame 30, and when the lower-layer seat material is deflected downward with sitting, the torsion bar 32 is twisted such that the upper end (the rear end of the cushioning material 20) of the movable frame 30 is moved forward downward, whereby an increase in tensile force, which tends to be caused due sitting, is suppressed. In addition, as shown in FIG. 7, instead of the movable frame 30 and the torsion bar 32, the rear end of the cushioning material 20 may be connected to the rear part of the seat part frame 14 through plural tension coil springs 34. And, in a configuration including a two-layer structure cushioning material 20, the seat cushion 18 is configured by stretching an upper layer seat material over the seat part frame 14 so as to be independent of the top of a lower-layer seat material.

The present invention is not limited to the above-mentioned preferable configuration of the seat cushion 18, which is the seat part, and the seat cushion 18 may be provided with any configuration.

Figure 4:
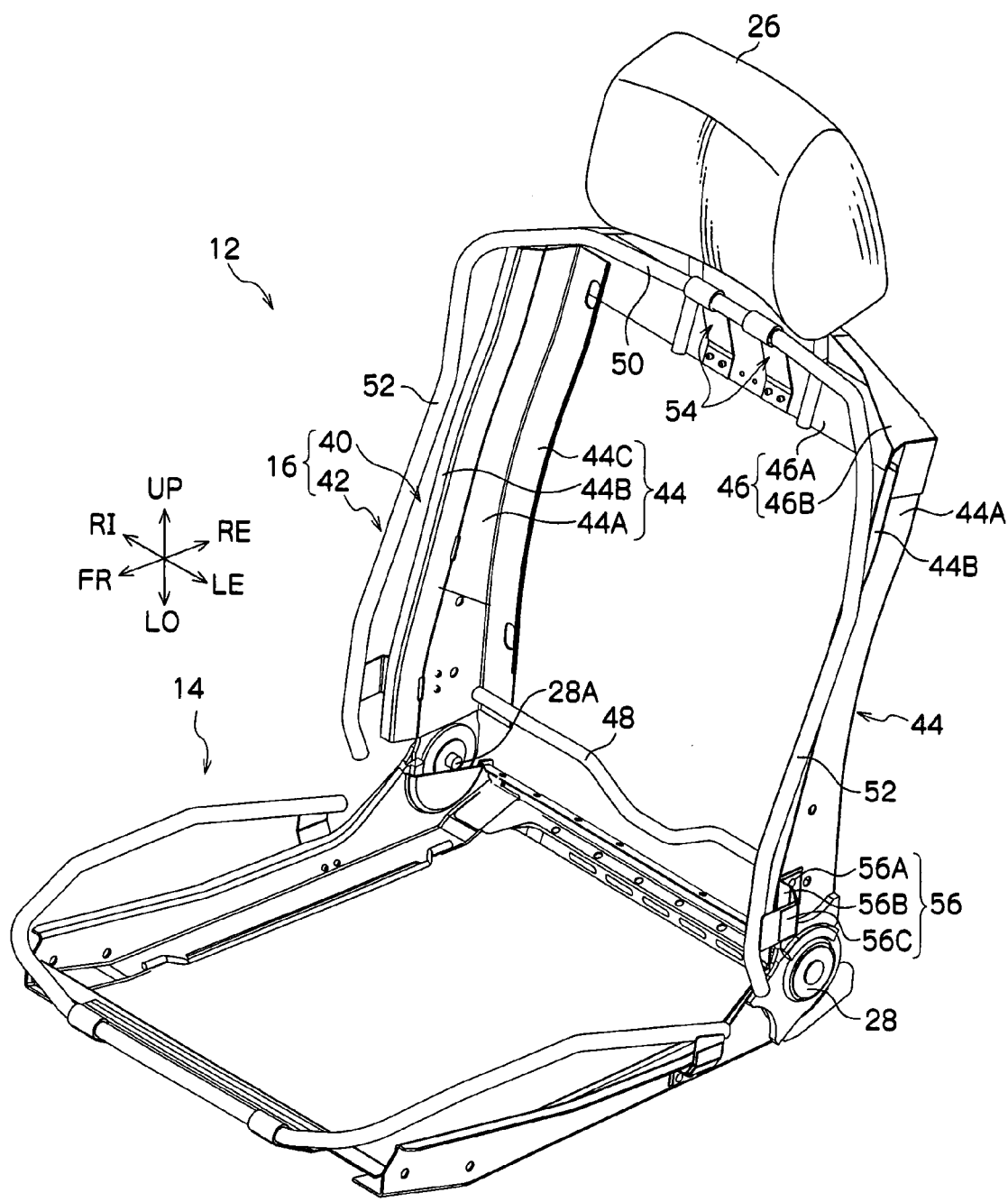
FIG. 4 is a perspective side view illustrating a seat frame constituting the vehicle seat pertaining to an embodiment of the present invention.

As shown in FIG. 4, the back part frame 16 is configured to include a main frame 40 which is connected to the rear end of the seat part frame 14 through the reclining mechanism 28, and a subframe 42 which is elastically mounted to the front side of the main frame 40.

The main frame 40 is configured to include a pair of, right and left, back part side frames 44, the respective lower end parts of which are connected to the rear end part of the seat part frame 14 through the reclining mechanism 28; an upper frame 46 which connects between the upper ends of the respective back part side frames 44, bridging them; and a lower frame 48 which bridges between and connects the lower rear ends of the respective back part side frames 44. That is, the main frame 40 is formed overall substantially in the shape of a rectangular frame, which provides high rigidity.

Figure 5:
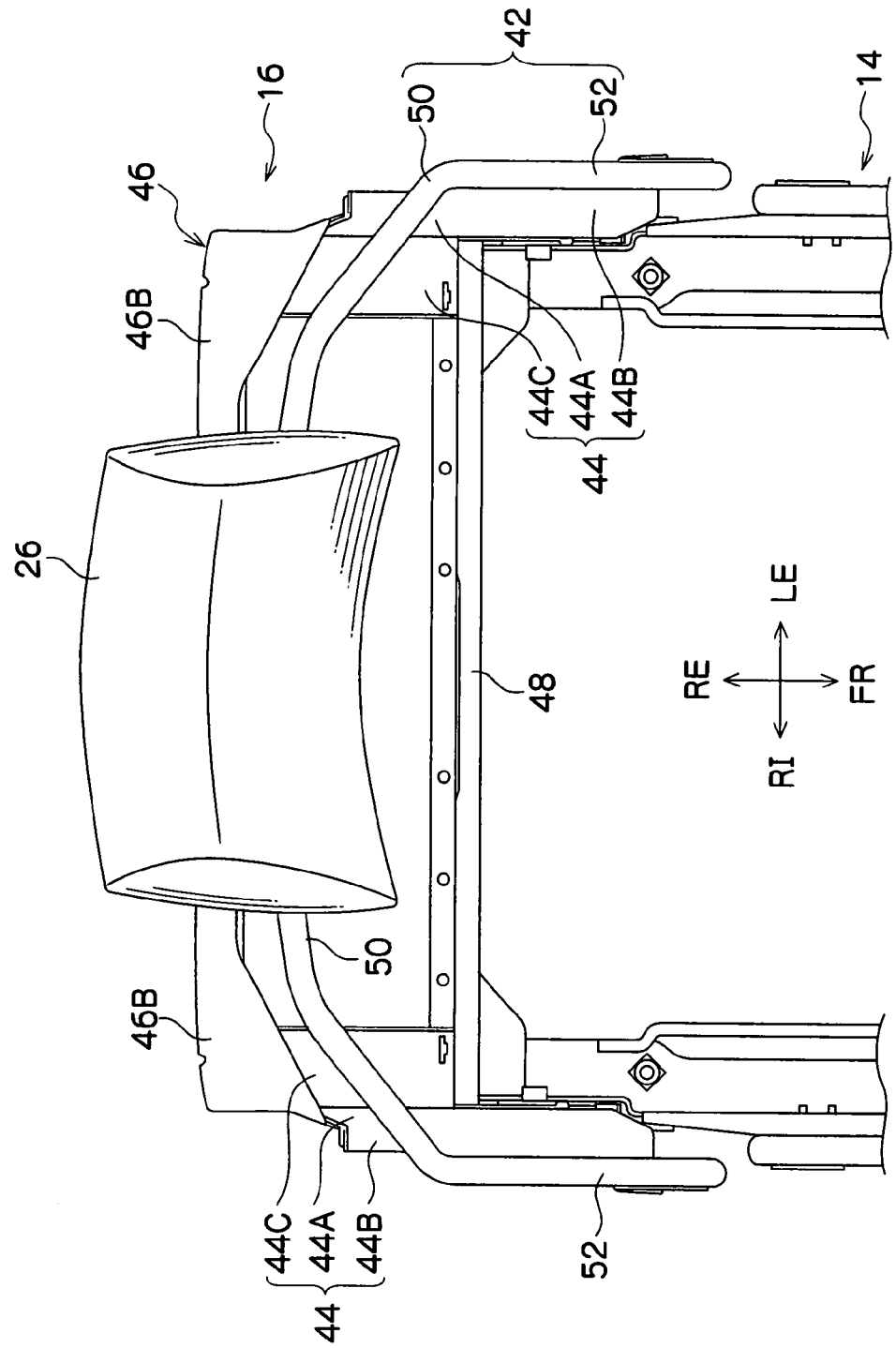
FIG. 5 is a plan view illustrating a back part frame and a headrest constituting the vehicle seat pertaining to an embodiment of the present invention.

The right and left back part side frames 44 are each constituted by a flat plate part 44A which is formed in the shape of a flat plate long in the upward and downward direction; a front flange part 44B which is extendedly provided from the front edge of the flat plate part 44A toward the outside of the seat; and a rear flange part 44C which is extendedly provided from the rear edge of the flat plate part 44A toward the inside of the seat. The lower frame 48 is constituted by a member in the shape of a pipe with the length thereof in the rightward and leftward directions. As shown in FIG. 5, both ends in the rightward and leftward directions are each anchored to the front face of the rear flange part 44C of the corresponding back part side frame 44 in the vicinity of the lower end thereof.

The upper frame 46 is constituted by a flat plate part 46A, both right and left ends of which are each secured to the back face of the rear flange part 44C of the corresponding back part side frame 44; and a visor part 46B which is provided in a manner that extends forwardly from the upper edge of the flat plate part 46A. The lateral central portion of the flat plate part 46A is projected upwardly beyond the two ends thereof (the upper ends of the back part side frames 44), and both left and right ends of the visor part 46B continuously increase in width in the forward and backward directions toward the outside of the seat, each folded downward, and secured to the flat plate part 44A of the corresponding back part side frame 44. With this configuration (geometry), the upper frame 46 is easy to be elastically deformed (is low in rigidity) in the direction of arrow A as shown in FIG. 1 in the lateral central part (especially the upper part thereof), where the flat plate part 46A is projected upward and the visor part 46B is narrow in width.

The subframe 42 is constituted by an upper subframe 50 which is long in the substantially left right direction, and a pair of right and left side part frames 52, which are suspended downward from respective right and left ends of the upper subframe 50. The subframe 42 being formed overall in a substantially U-shaped form which is open downward. In the present embodiment, with the subframe 42, the upper subframe 50 and the respective side part frames 52 are integrally formed by bending or otherwise working a pipe material, the respective side part frames 52 (the lower parts thereof) being made to be elastically deformable in each direction including the direction in which they are brought closer to or away from each other.

More specifically, as shown in FIG. 4 and FIG. 5, the upper subframe 50 is formed to be inclined at both end sides thereof such that both right and left ends thereof are located more to the front than the front flange part 44B of the back part side frame 44, respectively. Consequently, the respective side part frames 52 are located in front of the front flange part 44B, and slightly outward of the seat outer side. This upper subframe 50 is located in front of the upper frame 46 of the main frame 40, and the substantially central portion thereof in the rightward and leftward directions is connected to the upper frame 46 through leaf springs 54. In the present embodiment, two leaf springs 54 are provided.

The respective leaf springs 54 are in the shape of a flat sheet which is inclined forward; the respective lower end parts are fixed to a substantially laterally central portion of the flat plate part 46A of the upper frame 46; and the respective upper end parts are fixed to a substantially laterally central portion of the upper subframe 50. Consequently, the upper subframe 50 is made to be rockable in the direction in which it is brought closer to or away from the upper frame 46 (in the forward and backward directions) due to elastic deformation of the respective leaf springs 54. As shown in FIG. 2, the upper subframe 50 in a no-load state is located between the upper end of the back part side frame 44 and the upper end of the upper frame 46 as viewed vertically, and is located between the front and rear edges of the upper end of the back part side frame 44 as viewed anteroposteriorly. The imaginary lines in FIG. 2 show the position of the upper subframe 50 at the time of sitting.

Figure 3:
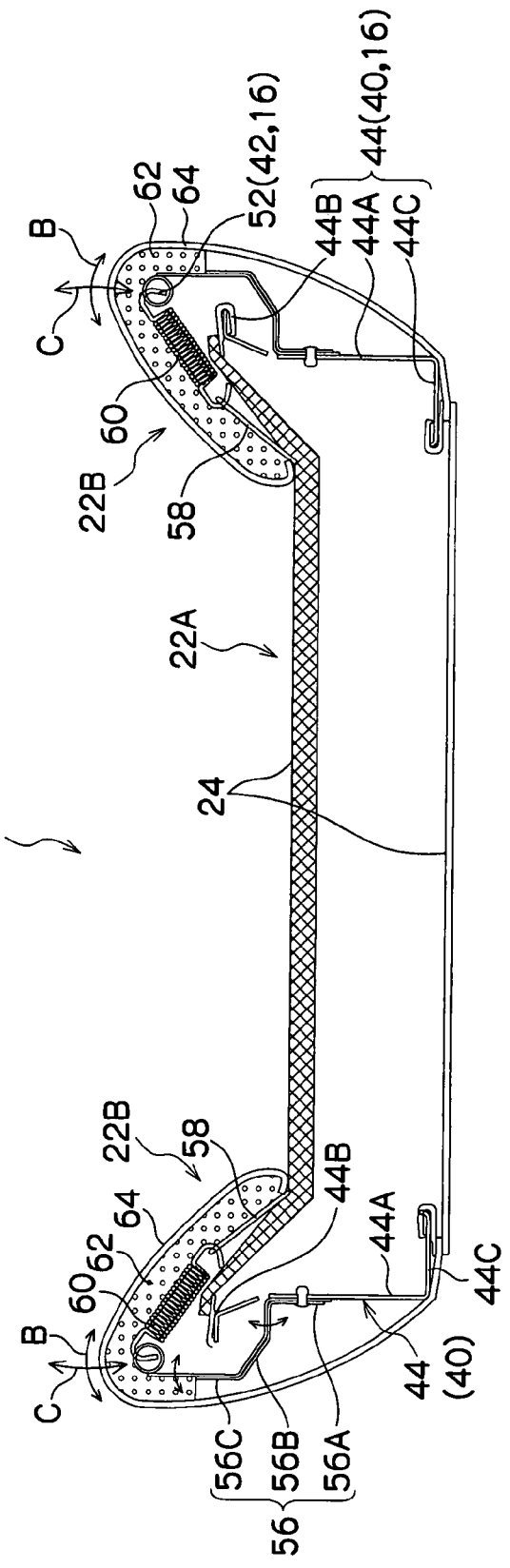
FIG. 3 is a sectional view along the line 3-3 in FIG. 2.

Each of the side part frames 52 is connected to corresponding one of the back part side frames 44 through a leaf spring 56, which serves as an elastic member, in the vicinity of the respective lower ends thereof. Each leaf spring 56 is configured to include a main side fixed part 56A which is fixed to the flat plate part 44A of the back part side frame 44; a anteroposterior deforming part 56B which is provided in a manner that extends from the front end of the main side fixed part 56A toward the outside of the seat; and a lateral deforming part 56C which is provided in a manner that extends forwardly from the seat outer side end part of the anteroprosterior deforming part 56B and whose tip part is attached to the side part frame 52. The respective leaf springs 56 have a configuration in which the anteroposterior deforming part 56B is deformed such that it is rocked around the main side fixed part 56A side end so as to allow the side part frame 52 to be rocked in an anteroposterior direction (the direction of arrow B as shown in FIG. 3), while the lateral deforming part 56C is deformed such that it is rocked around the anteroposterior deforming part 56B side end so as to allow the side part frame 52 to be rocked in a lateral direction (the direction of arrow C as shown in FIG. 3). With the respective leaf springs 56, the anteroposterior deforming part 56B and the lateral deforming part 56C can be deformed together, so that it is also possible to allow the side part frame 52 to be displaced in the direction in which the deformation in the direction of arrow B and that in the direction of arrow C are combined.

With the seat back 22, as described above, the back part cushioning material 24, which is a tensile structural element, is stretched over the back part frame 16, which is an elastic structural element, so as to structure a backrest 22A. In the present embodiment, the back part cushioning material 24 forms the backrest 22A as a single layer. This back part cushioning material 24 is formed by a tensile structural element which has a stiff spring characteristic and thus is difficult to be elongated in both the vertical and lateral directions. This tensile structural element may be a two-dimensional fabric (a cloth spring material) or a three-dimensional knitted material.

As shown in FIGS. 1 and 2, with the back part cushioning material 24, the laterally central portion thereof that corresponds to the crosswise width of the backrest 22A (the width substantially corresponding to the width between the inner edges of the right and left rear flange parts 44C) is wrapped around both the upper subframe 50 and the upper frame 46, and then folded back; the relatively thick-wall portion located on the front side forms the backrest 22A; and the relatively thin-wall portion located on the rear side forms the backface side skin. With the back part cushioning material 24, the lower end of the front side, which forms the backrest 22A, is connected to a portion in the vicinity of the rear end of the cushioning material 20 (the lower-layer seat material), and the lower end of the rear side constituting the back face side skin is attached to the rear end of the seat part frame 14 (not shown). In this state, the back part cushioning material 24 is stretched over the back part frame 16 with a tensile force providing an elongation of 5% or less in the vertical direction.

In addition, with the back part cushioning material 24, the upper end part on both right and left sides are attached to the upper subframe 50 (mainly the above-mentioned forwardly inclined portion) and a portion in the vicinity of the upper end (the corner part) of the side part frame 52 in the subframe 42, and portions ranging from the intermediate part in the vertical direction to the lower end are attached to the front flange part 44B of the back part side frame 44, respectively. In addition, as shown in FIGS. 1 and 3, pull cloths 58 are mounted at one edge thereof to both right and left sides of the lower part of the portion constituting the backrest 22A of the back part cushioning material 24, with the other edge of the pull cloths 58 being attached to one end of tension coil springs 60, the other end of the coil springs 60 being attached to the lower part of the side part frame 52. In the present embodiment, two each of left and right (four in total) tension coil springs 60 are provided, and the respective tension coil springs 60 are disposed such that the longitudinal direction thereof is substantially along the horizontal direction.

With this back part cushioning material 24, the backrest 22A which is formed between the pull cloth 58 mounting portions with the above-mentioned vertical tensile force, is located at an intermediate width (anteroposteriorly) part of the back part side frame 44 that is located more rearward than the front flange parts 44B which are attached to both right and left ends of the back part cushioning material 24. In other words, in the non-seated (no-load) state, the lateral tensile force to act on the back part cushioning material 24 is set to be less than the vertical tensile force. Further, the back part cushioning material 24, which is stretched over this back part frame 16, forms the backrest 22A, which is substantially flat in the non-seated state. Thus, the respective tension coil springs 60 are disposed inclined with respect to the anteroposterior direction such that, in the non-seated state, the seat outer side edge part is located more forward than the seat inner side edge part.

Further, in the seat back 22, the portion of the back part cushioning material 24 that is located more closely to the seat outer side than the backrest 22A is covered with a cushioning member 62 and a skin material 64 together with covering the back part side frame 44 and the side part frame 52 (see FIG. 3) so as to form side supports 22B. One end of the skin material 64 is mounted to the pull cloth 58 mounting portion of the back part cushioning material 24 by sewing, or the like, and the other end is attached to the rear flange part 44C of the back part side frame 44.

With the seat back 22 as described above, the tensile force directions for the back part cushioning material 24 in the seated state is made three-dimensional, and impedance and compliance matching with the muscles of the seated person that change periodically is timely provided to suppress the fatigue accumulation during sitting for a long period of time. And, with the back part frame 16 (the subframe 42) which is made to be an elastic structural element as described above, when a load inputted to the backrest 22A causes a tensile force act (change) on the back part cushioning material 24, the respective side part frames 52 are displaced (deformed) in the direction of arrow B or arrow C, and the leaf spring 54 deforms the upper subframe 50 in the direction in which it is brought closer to the upper frame 46 (see the broken lines in FIG. 2).

Consequently, the seat back 22 is provided with a configuration such that, when a rearward load acts on the backrest 22A, the backrest 22A is moved rearward while the increase in tensile force acting on the back part cushioning material 24 is suppressed so that the resilience (spring constant) associated with the displacement of the backrest 22A is reduced. Thus, the damping ratio of the seat back 22 is increased, so that in the ordinary seated state, vibrations transmitted from the seat back 22 to the seated person are absorbed, and when a great load is inputted during a collision (rear collision), or the like, it is greatly damped in its action on the seated person (the damping ratio is controlled), thereby effectively absorbing the impact. The elongation of the back part cushioning material 24 in the static seated state is suppressed to 20% or less in the lateral direction, and is also suppressed to 20% or less in the vertical direction, whereby an allowance for change in tensile force is provided in the respective directions.

As shown in FIG. 1 and FIG. 2, the headrest 26 includes headrest stays, one each left and right, which are provided at a laterally central portion of the upper frame 46 constituting the main frame 40 of the back part frame 16. The headrest stays 66 each are configured so as to be long in the substantially vertically direction, and fixed to the upper frame 46 in a manner such that they are spaced apart from each other in the lateral direction and the pair of leaf springs 54 is located therebetween. Thus, the respective headrest stays 66 are configured such that, when the upper frame 46 is deformed in the direction of arrow A, they are turned (inclined forward) in the direction of arrow A.

Each of the headrest stays 66 are provided with an adjuster 70, and the adjusters 70 are connected to each other through a headrest plate 68. The headrest stays 66 are inserted through the respective adjusters 70, and by moving the adjusters along the longitudinal direction of the headrest stays, the height position of the headrest 26 can be adjusted. The headrest 26 is configured in a manner such that the respective headrest stays 66, the headrest plate 68, and the respective adjusters 70 are covered with a cushioning member and a skin material.

The headrest 26 as described above is provided with a configuration in which since it is guided such that the headrest stays 66 are permitted to be displaced only in the longitudinal direction with respect to the back part frame 16, when the upper frame 46 of the back part frame 16 is deformed in the direction of arrow A, or when the headrest stay 66 is turned in the direction of arrow A as mentioned above, the headrest is moved forward (in the direction of arrow D as shown in FIG. 2) by an amount corresponding to the angle of turning.

Next, the operation of the present first embodiment will be described.

With the vehicle seat 10 as configured above, when a vehicle occupant is seated, the backrest 22A is displaced backward while tensioning tension coil springs 60 via the pull cloth 58. At this time, the leaf springs 54 are deformed, and the subframe 42 is moved rearward as a whole. In addition, the tensile force of the back part cushioning material 24 constituting the backrest 22A is transmitted from the right and left pull cloths 58 and the tension coil springs 60 to the respective side part frames 52, and due to this tensile force, the right and left side part frames 52 are brought closer to each other (are displaced in the direction of arrow C to be brought closer to each other while causing the tension coil springs 60 to be deformed), whereby an increase in tensile force of the back part cushioning material 24 is suppressed.

Thus, the backrest 22A (the back part cushioning material 24) changes its geometry into a three-dimensional geometry that corresponds to the upper part of the body of the seated person and supports the seated person in a manner that wraps around the seated person with a soft structure. Since the tensile force of the backrest 22A in the seated state is small, the damping ratio of the vibration system of the seat back 22 (the vehicle seat 10) including the seated person is high, so that the vibrations transmitted from the seat back 22 to the seated person are effectively absorbed. In other words, with the seat back 22, vibrations due to impact of the back part cushioning material 24 (the backrest 22A) are reduced, and thus the vibrations transmitted to the head of the seated person are relieved. Further, body movements of the seated person associated with breathing are allowed (accommodated) by the deformation of the back part cushioning material 24. Thus, the load on the seated person is reduced so that the sitting comfortableness is improved and the stress when seated for a long-time is alleviated.

Meanwhile, at the time of a collision from the rear of the vehicle (a rear collision), a rearward impact load is imparted to the backrest 22A, and thus the right and left side part frames 52 cause the respective tension coil springs 60 to be elongated, and are displaced in the direction in which they are brought closer to each other, while causing the respective leaf springs 54 to be deformed. Consequently, the back part cushioning material 24 is deflected rearward while the increase in tensile force is suppressed, and with a large amount of damping (a high damping ratio), the impact can be effectively absorbed. In other words, with the vehicle seat 10, the damping ratio is controlled (a damping ratio commensurate with the input is provided) by the deformation of the back part frame 16, which is an elastic structural element, whereby the impact force can be absorbed (in a certain period of time) while the load acting on the seated person is sufficiently reduced.

In addition, at this time, the back part cushioning material 24, which is wrapped around the upper frame 46 and the upper subframe 50 from the upper side, causes the upper frame 46 to be deformed by the tensile force of the back part cushioning material 24 (mainly the tensile force in the vertical direction) such that the upper end is moved forward (in the direction of arrow A). Then, the headrest stay 66, which is fixed to the upper frame 46, is inclined forward, and the headrest 26 is moved forward.

Figure 6:
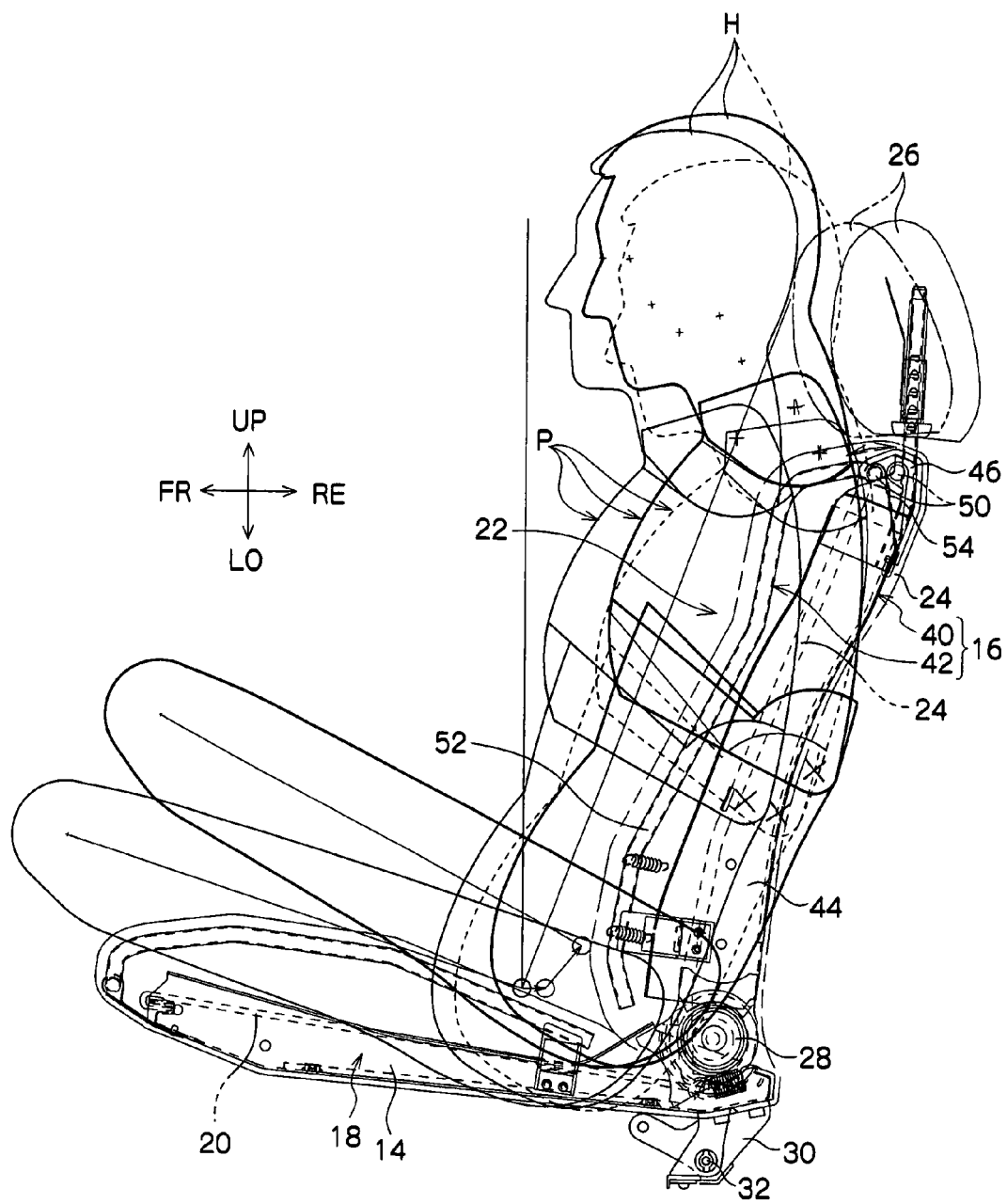
FIG. 6 is a side view of the seated state of the vehicle seat pertaining to an embodiment of the present invention.

Consequently, at the initial stage after a rear collision, the headrest 26 is caused to be located right behind the head of the seated person, so that the rearward movement of the head can be effectively suppressed. Specifically, as shown in FIG. 6, at the initial stage of a rear collision, although the seated person P is gradually displaced backward from the position indicated by thin solid lines to the position indicated by broken lines, and then to the position indicated by bold solid lines, since at the very initial stage of a rear collision indicated by thin solid lines (at the stage in which the displacement from the normal seated state is extremely small), the headrest 26 is caused to be located right at the back of the head H of the seated person P, so that at the position indicated by broken lines, the rearward displacement of the head H is effectively suppressed by the headrest 26, and the rocking back of the head H indicated by bold solid lines is minimized. In this manner, the damage to the neck of the seated person at the time of a rear collision can be suppressed or prevented.

As will be appreciated, the vehicle seat 10 pertaining to the present embodiment has a high vibration absorbing characteristics and impact absorbing characteristics. That is, with the present vehicle seat 10, it is possible to effectively control the damping ratio by virtue of the elasticity of the back part frame 16 over which a tensile structural element is stretched. In addition, with the vehicle seat 10, it is possible to protect the neck of the seated person at the time of impact input from the rear without impairing normal sitting comfort.

In addition, with the vehicle seat 10, the back part frame 16 is constituted by the main frame 40, and the subframe 42, which is elastically supported by the main frame 40 through the leaf springs 54, 56. Thus, the main frame 40 secures the basic rigidity for the seat (the seat back 22), and the subframe 42 performs, as an elastic structural element, the function to control (adjust) the tensile force of the back part cushioning material 24. In other words, the back part frame 16 can make the tensile force (damping ratio) controlling function independent of the function to secure the rigidity in the seat back 22, which facilitates the design and improves the reliability.

Further, with the vehicle seat 10, the headrest 26 can be moved forward by a simplified structure since the upper subframe 50, which is disposed in front of the upper frame 46, causes the upper frame 46 to be deformed in the direction of arrow A due to the tensile force of the back part cushioning material 24, i.e., since by wrapping the back part cushioning material 24 around the upper subframe 50 located in front of the upper frame 46, the tensile force of the back part cushioning material 24 is transformed into a force to deform the upper frame 46 in the direction of arrow A.

Further, unlike a conventional configuration in which the headrest 26 is moved via a link mechanism structured such that a portion, which is pressed by the lumber portion of the seated person, serves as an input element, there is no possibility that the seated person is brought into contact with an input element in the normal seated state and made to feel a sense of discomfort as with the above-mentioned link mechanism. Further, in the normal seated state, there is no possibility that the upper subframe 50 contacts the shoulder part of the seated person who is appropriately seated (refer to the thin solid lines in FIG. 6). In addition, since the back part cushioning material 24, which is a tensile structural element, directly deforms the upper frame 46, the headrest 26 can be sufficiently moved with a small rearward input stroke, as compared to that for the configuration including the above-mentioned link mechanism. Thus, at the initial stage of a rear collision, the headrest 26 can be reliably moved to the head side of the seated person.

Furthermore, with the vehicle seat 10, when, for example, an impact is applied from an oblique direction with respect to the anteroposterior direction, the right and left side part frames 52 absorb the impact while being displaced to the same side as each, as indicated by arrow B or arrow C (in a direction maintaining mutual parallelism). At this time, although one of the side part frames 52 is inclined outward (displaced in the direction to increase the tensile force of the back part cushioning material 24), the load is shared and supported by the leaf springs 56 so that the stress acting on the side part frame 52 is relieved, and the damage to the back part frame 16 is prevented or suppressed. In other words, the leaf springs 56 perform the function to reinforce the side part frame 52 without obstructing the displacement of the side part frame 52 (the deformation of the subframe 42).

In the above-described embodiment, a preferred configuration has been provided which is equipped with both the function to control the damping ratio by stretching the back part cushioning material 24 over the back part frame 16 of an elastic structure, and the function to cause the headrest 26 to be moved forward due to the tensile force of the back part cushioning material 24. However, the present invention is by no means limited thereto, and, for example, may be embodied in a configuration equipped with only one of the above functions.

In addition, in the above-described embodiment, a preferred configuration has been provided in which the back part frame 16 is constituted by the main frame 40 and the subframe 42. However, the present invention is by no means limited thereto, and, for example, the main frame 40 may be configured as an elastic structural element. Further, the present invention is not be limited by the support structure of the subframe 42 for the main frame 40, and, for example, the main frame 40 and the subframe 42 may connected to each other by any other elastic member, or the like, instead of a part or all of the leaf springs 54, 56, or in addition thereto.

Further, in the above-described embodiment, an example of so-called low-back structure which includes the headrest 26 independent of the seat back 22 has been given. However, the present invention is by no means limited thereto, and, for example, the headrest 26 may be integrally provided on the top of the seat back 22 (the upper frame 46).

In addition, in the above-described embodiment, the present invention has been embodied in a configuration to be applied to the vehicle seat 10. However, the present invention is by no means limited thereto, and, for example, may also be applied to seats for various forms of transport, such as train carriages, ships, aircrafts, and the like, and various seats for office chairs, furniture chairs, and the like.

EXPLANATION OF REFERENCE NUMERALS

10: Vehicle seat (seat)
16: Back part frame
18: Seat cushion (seat part)
22: Seat back
24: Back part cushioning material (tensile structural element)
26: Headrest
40: Main frame
42: Subframe
46: Upper frame (upper part of main frame)
50: Upper subframe
52: Side part frame
54: Leaf spring
56: Leaf spring (elastic member)

What is claimed is:

1. A seat comprising:
a back part frame which comprises a main frame and which is elastically deformable in a direction in which right and left side part frames of the back part frame are brought closer to, or moved away from, each other;
a tensile structural element which is stretched between the right and left side part frames so as to configure a backrest; and
a headrest mounted to an upper part of the back part frame, wherein
the back part frame is configured such that the right and left side part frames are connected through an elastic member to a front part of the main frame which is connected to a seat part,
the back part frame deforms in a direction such that the headrest is moved forward due to a tensile force acting on the tensile structural element,
the back part frame is provided with the headrest at the upper part of the main frame, and a subframe is disposed in front of the upper part of the main frame,
the tensile structural element is stretched, being wrapped around the upper part of the main frame and the subframe, and transforms the tensile force in a vertical direction into a force which acts to move an upper end of the main frame forward,
the subframe comprises an upper subframe disposed in front of the upper part of the main frame and around which the tensile structural element is wrapped, and the right and left side part frames extend downward, respectively, from both right and left ends of the upper subframe and are able to be brought closer to, or moved away from, each other,
the tensile structural element is stretched between the right and left side part frames,
the upper subframe is connected to the upper part of the main frame through leaf springs in a manner that is able to be brought closer to or away from the upper part of the main frame, and
a lower part of the respective side part frames is connected, through a leaf spring formed by being bent, to a lower part of the main frame such that the respective side part frames are independently rockable in an anteroposterior direction and in a lateral direction.

2. A seat comprising:
a back part frame comprising a main frame connected to a seat part;
a headrest provided at an upper part of the back part frame; and
a tensile structural element which is stretched across the back part frame so as to configure a backrest, and which causes the back part frame to deform such that the headrest is moved forward due to a tensile force in the tensile structural element which is produced by a load imparted to the backrest, wherein
the back part frame is provided with the headrest at the upper part of the main frame, and a subframe is disposed in front of the upper part of the main frame,
the tensile structural element is stretched, being wrapped around the upper part of the main frame and the subframe, and transforms the tensile force in a vertical direction into a force which acts to move an upper end of the main frame forward,
the subframe comprises an upper subframe disposed in front of the upper part of the main frame and around which the tensile structural element is wrapped, and right and left side part frames extend downward, respectively, from both right and left ends of the upper subframe and are able to be brought closer to, or moved away from, each other,
the tensile structural element is stretched between the right and left side part frames,
the upper subframe is connected to the upper part of the main frame through leaf springs in a manner that is able to be brought closer to or away from the upper part of the main frame, and
a lower part of the respective side part frames is connected, through a leaf spring formed by being bent, to a lower part of the main frame such that the respective side part frames are independently rockable in an anteroposterior direction and in a lateral direction.

* * * * *